(12) United States Patent
Straub

(10) Patent No.: US 9,479,812 B2
(45) Date of Patent: Oct. 25, 2016

(54) USER SELECTION OF SOFTWARE COMPONENTS IN A TELEVISION SET-TOP BOX

(75) Inventor: Albert Straub, Westminster, CO (US)

(73) Assignee: TIME WARNER CABLE ENTERPRISES LLC, New York, NY (US)

(*) Notice: Subject to any disclaimer, the term of this patent is extended or adjusted under 35 U.S.C. 154(b) by 1783 days.

(21) Appl. No.: 12/544,357

(22) Filed: Aug. 20, 2009

(65) Prior Publication Data

US 2010/0313223 A1  Dec. 9, 2010

Related U.S. Application Data

(60) Provisional application No. 61/184,412, filed on Jun. 5, 2009.

(51) Int. Cl.
| | |
|---|---|
| G06F 3/00 | (2006.01) |
| G06F 13/00 | (2006.01) |
| H04N 5/455 | (2006.01) |
| H04N 21/27 | (2011.01) |
| H04N 21/434 | (2011.01) |
| H04N 21/4722 | (2011.01) |
| H04N 21/81 | (2011.01) |

(52) U.S. Cl.
CPC .......... *H04N 21/27* (2013.01); *H04N 21/4349* (2013.01); *H04N 21/4722* (2013.01); *H04N 21/818* (2013.01); *H04N 21/8173* (2013.01)

(58) Field of Classification Search
CPC ............. H04N 21/27; H04N 21/4349; H04N 21/4722; H04N 21/8173; H04N 21/818
USPC ............ 725/132, 68, 71, 100, 131, 139, 151
See application file for complete search history.

(56) References Cited

U.S. PATENT DOCUMENTS

| | | | |
|---|---|---|---|
| 7,058,964 B2 * | 6/2006 | Khandelwal et al. | 725/25 |
| 7,500,235 B2 | 3/2009 | Maynard | |
| 2004/0181811 A1 * | 9/2004 | Rakib | 725/122 |
| 2005/0055685 A1 | 3/2005 | Maynard | |
| 2005/0144651 A1 * | 6/2005 | Prus et al. | 725/134 |
| 2007/0028265 A1 * | 2/2007 | D'Souza et al. | 725/45 |
| 2007/0121651 A1 | 5/2007 | Casey | |
| 2007/0214477 A1 | 9/2007 | Read | |
| 2008/0034392 A1 * | 2/2008 | McCarthy et al. | 725/61 |
| 2008/0134165 A1 | 6/2008 | Anderson | |
| 2009/0183219 A1 | 7/2009 | Maynard | |
| 2009/0248794 A1 | 10/2009 | Helms | |

OTHER PUBLICATIONS

OpenCable Application Platform Specs, OCAP 1.1 Profile, OC-SP-OCAP1.1.1-090612, downloaded from http://www.cablelabs.com/specifications/OC-SP-OCAP1.1.1-090612.pdf, pp. 1-257.

(Continued)

*Primary Examiner* — Pankaj Kumar
*Assistant Examiner* — Alazar Tilahun
(74) *Attorney, Agent, or Firm* — Otterstedt, Ellenbogen & Kammer, LLP

(57) ABSTRACT

A method for allowing user selection of interactive video software components in a television STB operatively coupled to a video content network includes the steps of: affording the user a selection of interactive video software components to run on the set-top box; and loading selected interactive video software components onto the set-top box. The selected interactive video software components are delivered from a remote node over the video content network to which the STB is coupled.

19 Claims, 12 Drawing Sheets

(56) References Cited

OTHER PUBLICATIONS

OpenCable™ Specifications, Common Download 2.0, OC-SP-CDL2.0-I08-090206, downloaded from http://www.cablelabs.com/specifications/OC-SP-CDL2.0-I08-090206.pdf.

Albert W. Straub, Providing Syndication Feed Content on a Television Set-Top Box with Limited Decoder Capability, U.S. Appl. No. 12/618,986, filed Nov. 16, 2009 (not yet published).

Albert Straub, Techniques for Upgrading Software in a Video Content Network, U.S. Appl. No. 12/573,526, filed Oct. 5, 2009 (not yet published).

* cited by examiner

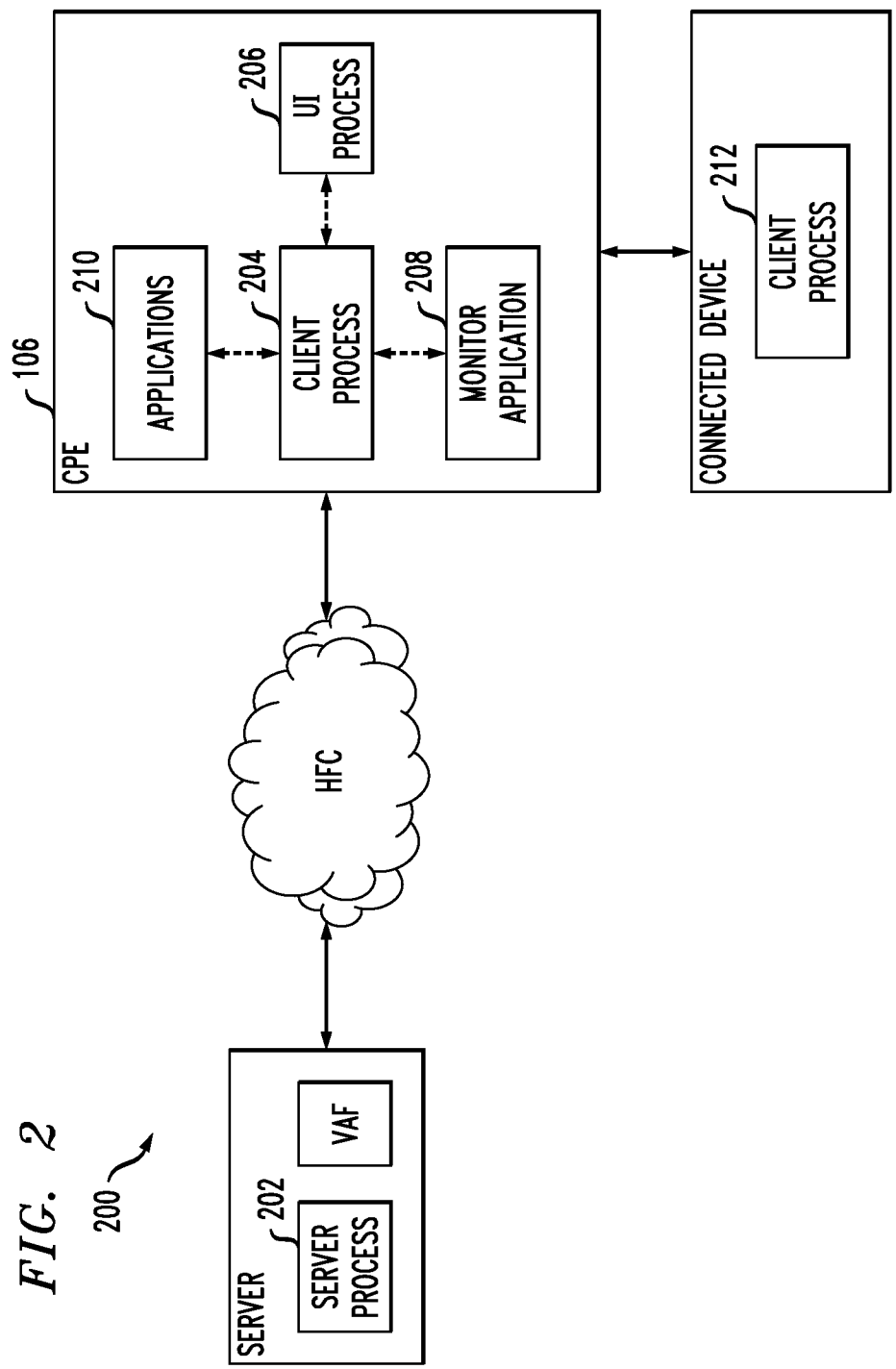

USER SELECTION OF SOFTWARE COMPONENTS IN A TELEVISION SET-TOP BOX

CROSS-REFERENCE TO RELATED APPLICATION(S)

This application claims the benefit of U.S. Provisional Application Ser. No. 61/184,412, filed on Jun. 5, 2009, the complete disclosure of which is expressly incorporated herein by reference in its entirety for all purposes.

FIELD OF THE INVENTION

The present invention relates generally to the electrical, electronic, and computer arts, and more particularly relates to video content networks.

BACKGROUND OF THE INVENTION

With the advent of digital communications technology, many TV program streams are transmitted in digital formats. For example, Digital Satellite System (DSS), Digital Broadcast Services (DBS), and Advanced Television Standards Committee (ATSC) program streams are digitally formatted pursuant to the well known Moving Pictures Experts Group 2 (MPEG-2) standard. The MPEG-2 standard specifies, among other things, the methodologies for video and audio data compression allowing for multiple programs, with different video and audio feeds, to be multiplexed in a transport stream traversing a single transmission channel. A digital TV receiver may be used to decode an MPEG-2 encoded transport stream, and extract the desired program therefrom.

The compressed video and audio data are typically carried by continuous elementary streams, respectively, which are broken into access units or packets, resulting in packetized elementary streams (PESs). These packets are identified by headers that contain time stamps for synchronization, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only includes a multiplex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption), and this information (i.e., whether open or subject to conditional access) is also carried in the MPEG-2 transport stream, typically as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

A set-top terminal or the like in the home or other premises receives the compressed video and audio data. The set-top terminal typically runs various software applications.

SUMMARY OF THE INVENTION

Techniques are provided for allowing user selection of software components in a television set top box (STB).

In accordance with an embodiment of the invention, a method for allowing user selection of interactive video software components in a television STB operatively coupled to a video content network includes the steps of: affording the user a selection of interactive video software components to run on the set-top box; and loading selected interactive video software components onto the set-top box. The selected interactive video software components are delivered from a remote node over the video content network to which the STB is coupled.

In accordance with another embodiment of the invention, a system includes a set-top box having a set-top box memory and at least one set-top box processor coupled to the set-top-box memory; a video content network; and at least one configuration server having a configuration server memory and at least one configuration server processor coupled to the configuration server memory. The at least one set-top box processor and the at least one configuration server processor are cooperatively operative to: facilitate affording a user a selection of interactive video software components to run on the set-top box; and facilitate loading selected interactive video software components onto the set-top box, the selected interactive video software components being delivered to the set-top box over the video content network.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

Techniques of the present invention can provide substantial beneficial technical effects. For example, one or more embodiments may have one or more of the following advantages:

The OpenCable™ (Cable Television laboratories, Inc.)
    Application Platform (OCAP) specification, which provides for networking protocols both downstream and upstream, continues to evolve. If an end user has purchased a non-upgradeable host device that will only operate on specific, older releases of an application, techniques of the invention enable the user to select a specific version of that application rather than have the device rendered obsolete by more advanced versions of software that use newer application programming interfaces (APIs) that are unavailable on the older host device.

Cable set-top boxes (STBs) are generally embedded systems with finite memory resources. With a variety of software applications available, techniques of the invention will enable an end user to have the ability to select the software application(s) that best suit the device(s) connected to the STB.

Techniques of the invention beneficially allow installation personnel to at least temporarily load system diagnostic applications on the STB in order to troubleshoot wiring and STB issues within the home.

The current OCAP specification only allows software images to be selected via an MPEG table known as the eXtended Application Information Table (XAIT). As additional applications are added to the XAIT, the table increases in size. The size of the table eventually reaches a finite limit based on the cycle time of the table and the bit rate of the table. Techniques of the invention advantageously circumvent the use of the XAIT and the corresponding limitation on the number of applications that can be provided.

Techniques of the invention allow for the imposition of a rating system on applications running on the STB so that parental controls can be exercised via the selection of which applications are available on the STB.

These and other features and advantages of the present invention will become apparent from the following detailed description of illustrative embodiments thereof, which is to be read in connection with the accompanying drawings.

BRIEF DESCRIPTION OF THE DRAWINGS

FIG. 2 is a functional block diagram depicting an illustrative software provisioning architecture in which techniques of the present invention may be used;

FIG. 9 is a functional block diagram showing non-limiting exemplary mechanisms for providing software to set top terminals and the like;

DETAILED DESCRIPTION OF PREFERRED EMBODIMENTS

Figure 1:
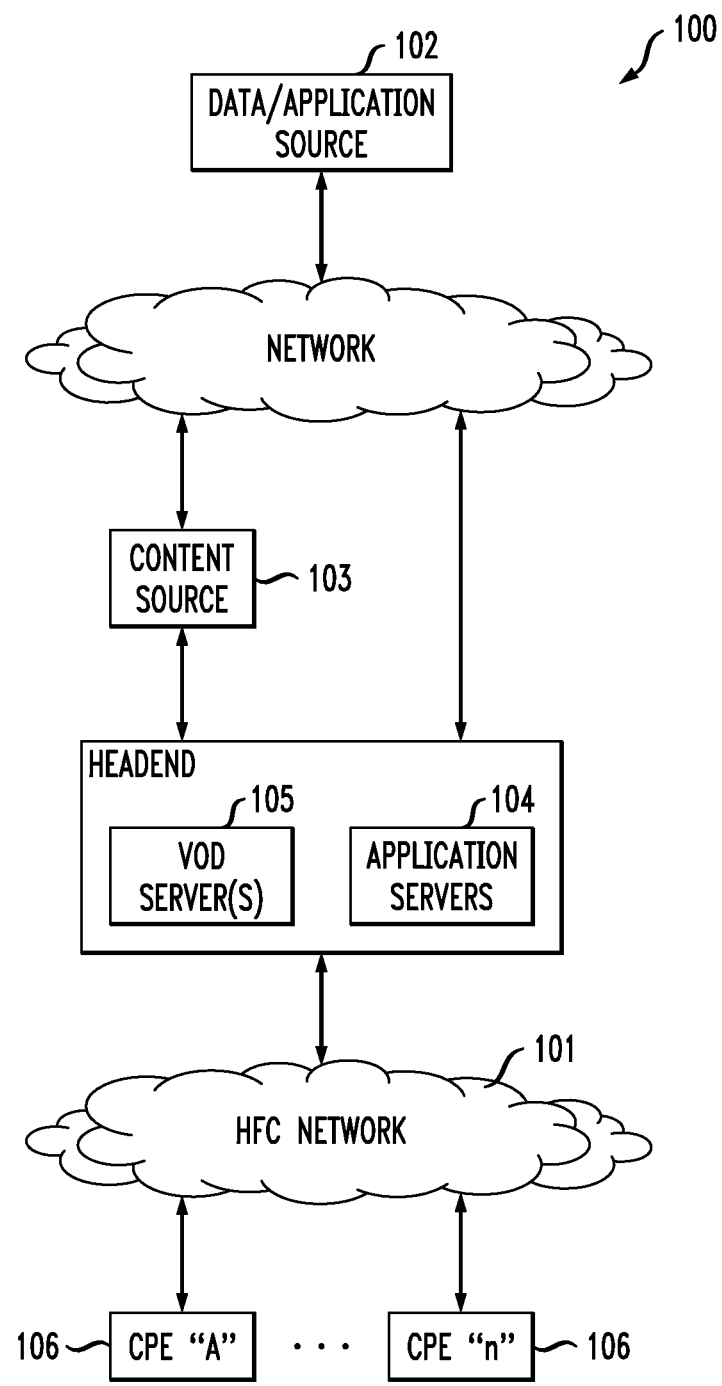
FIG. 1 is a functional block diagram illustrating an exemplary hybrid fiber-coaxial (HFC) network configuration useful with one or more embodiments of the present invention.

Initially, the complete disclosure of United States Patent Application Publication 2008/0134165 of Anderson et al. entitled "Methods and apparatus for software provisioning of a network device," published on Jun. 5, 2008, is expressly incorporated herein by reference in its entirety for all purposes. FIG. 1 illustrates a typical content-based network configuration 100 with which techniques of the present invention may be used. The various components of the network 100 include (i) one or more data and application origination points 102; (ii) one or more content sources 103, (iii) one or more application distribution servers 104; (iv) one or more video-on-demand (VOD) servers 105, and (v) consumer (or customer) premises equipment (CPE) 106. The distribution server(s) 104, VOD servers 105 and CPE(s) 106 are connected via a bearer (e.g., HFC) network 101. A simple architecture is shown in FIG. 1 for illustrative brevity, although it will be recognized that comparable architectures with multiple origination points, distribution servers, VOD servers, and/or CPE devices (as well as different network topologies) may be utilized consistent with the invention. For example, the head-end architecture of FIG. 1a (described in greater detail below) may be used.

It should be noted at this point that in addition to a conventional HFC network or a switched digital network to be discussed below, other kinds of video content networks can be employed for network 101 (e.g., fiber-to-the-home (FTTH) or fiber-to-the-curb (FTTC)).

The data/application origination point 102 comprises any medium that allows data and/or applications (such as a VOD-based or "Watch TV" application) to be transferred to a distribution server 104. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the customers' premises (or other appropriate locations) that can be accessed by a distribution server 104.

Figure 1A:
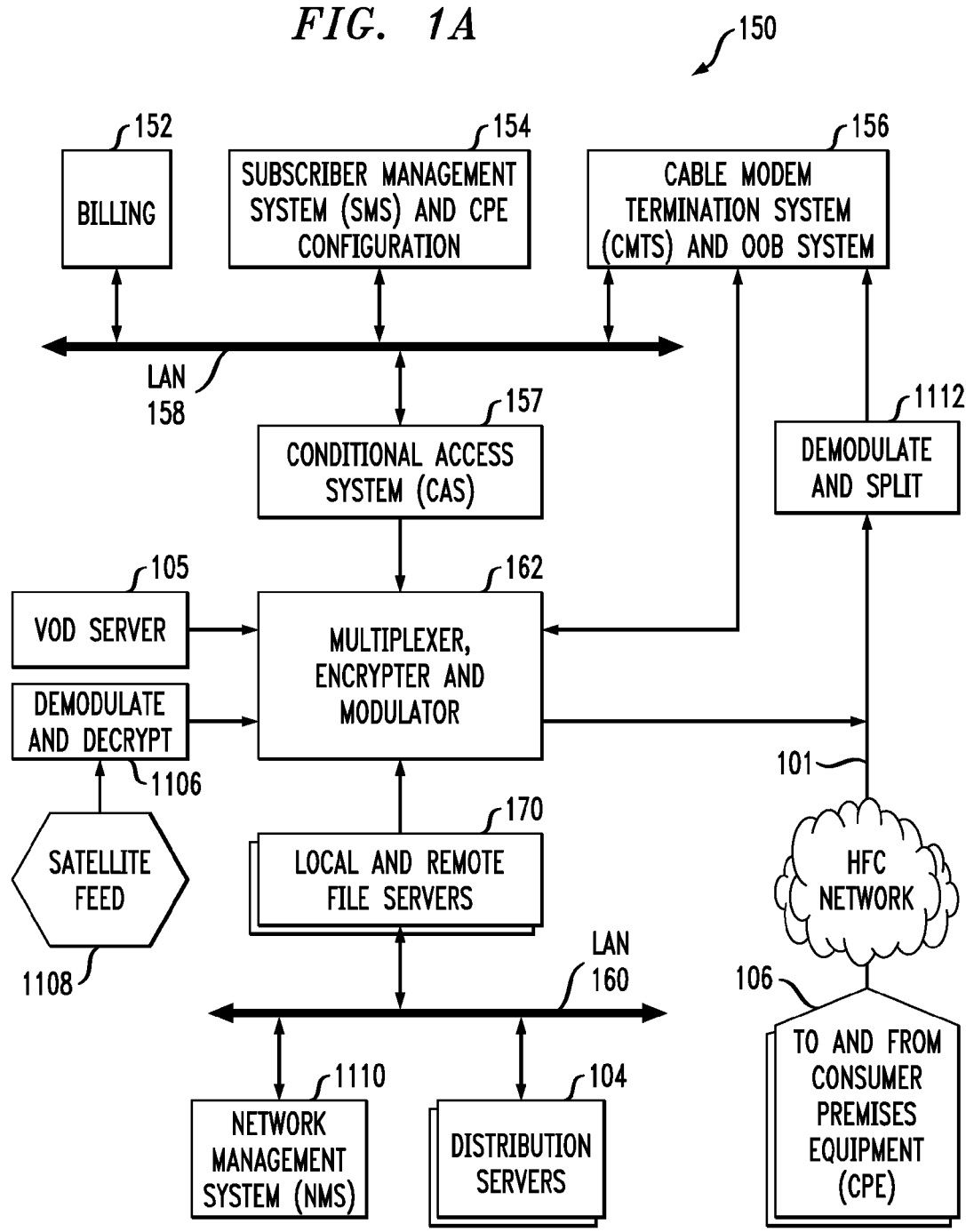
FIG. 1a is a functional block diagram illustrating one exemplary HFC cable network head-end configuration useful with one or more embodiments of the present invention.

Referring now to FIG. 1*a*, one exemplary embodiment of a head-end architecture useful with the present invention is described. As shown in FIG. 1*a*, the head-end architecture 150 comprises typical head-end components and services including billing module 152, subscriber management system (SMS) and CPE configuration management module 154, cable-modem termination system (CMTS) and out-of-band (OOB) system 156, as well as LAN(s) 158, 160 placing the various components in data communication with one another. It will be appreciated that while a bar or bus LAN topology is illustrated, any number of other arrangements (e.g., ring, star, etc.) may be used consistent with the invention. It will also be appreciated that the head-end configuration depicted in FIG. 1*a* is high-level, conceptual architecture and that each multi-service operator or multiple system operator (MSO) may have multiple head-ends deployed using custom architectures.

The architecture 150 of FIG. 1*a* further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (see FIG. 1*b*) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols. The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Figure 1B:
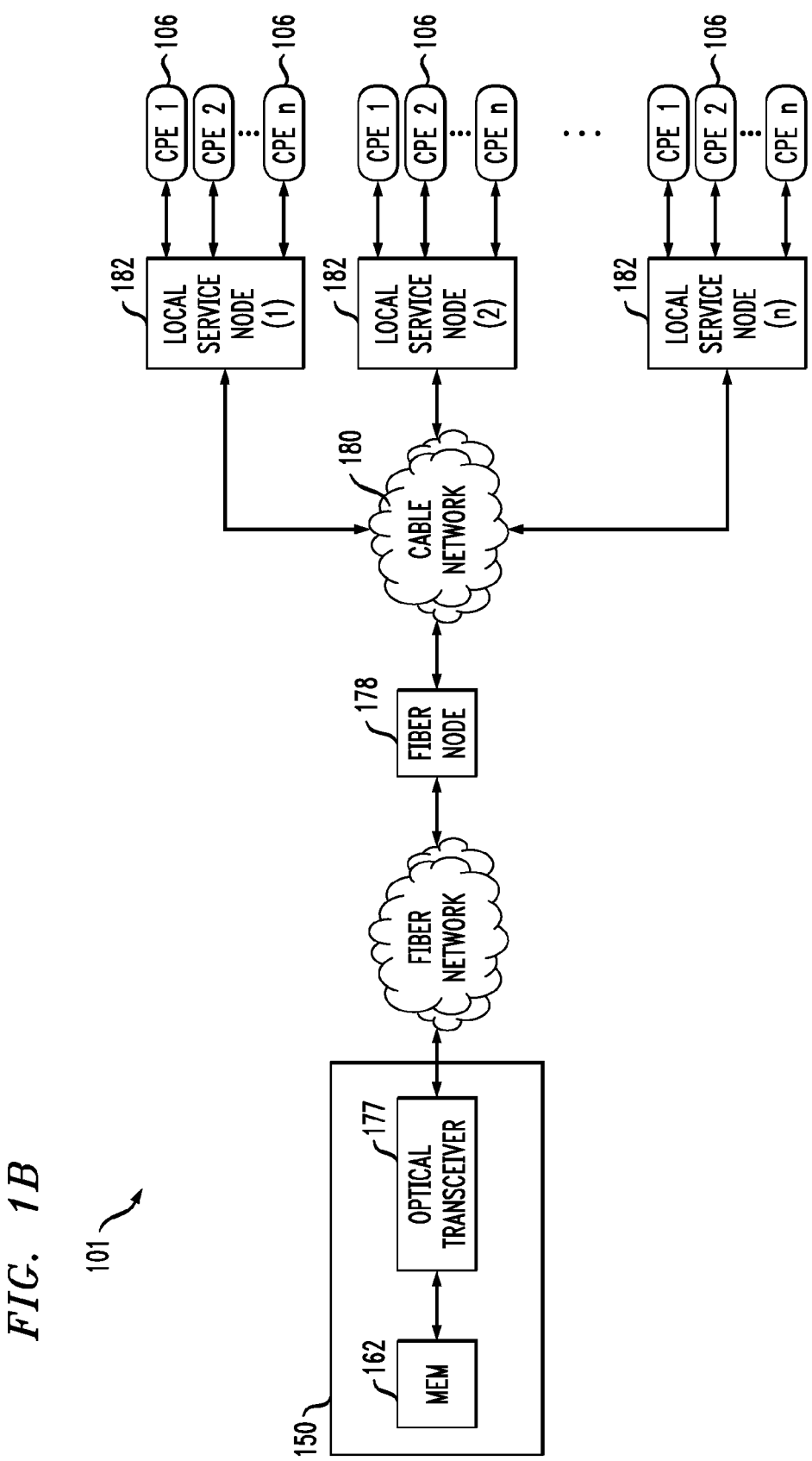
FIG. 1b is a functional block diagram illustrating one exemplary local service node configuration useful with one or more embodiments of the present invention.

As shown in FIG. 1*b*, the network 101 of FIGS. 1 and 1*a* comprises a fiber/coax arrangement wherein the output of the MEM 162 of FIG. 1*a* is transferred to the optical domain (such as via an optical transceiver 177 at the head-end or further downstream). The optical domain signals are then distributed to a fiber node 178, which further distributes the signals over a distribution network 180 to a plurality of local servicing nodes 182. This provides an effective 1:N expansion of the network at the local service end.

Figure 1C:
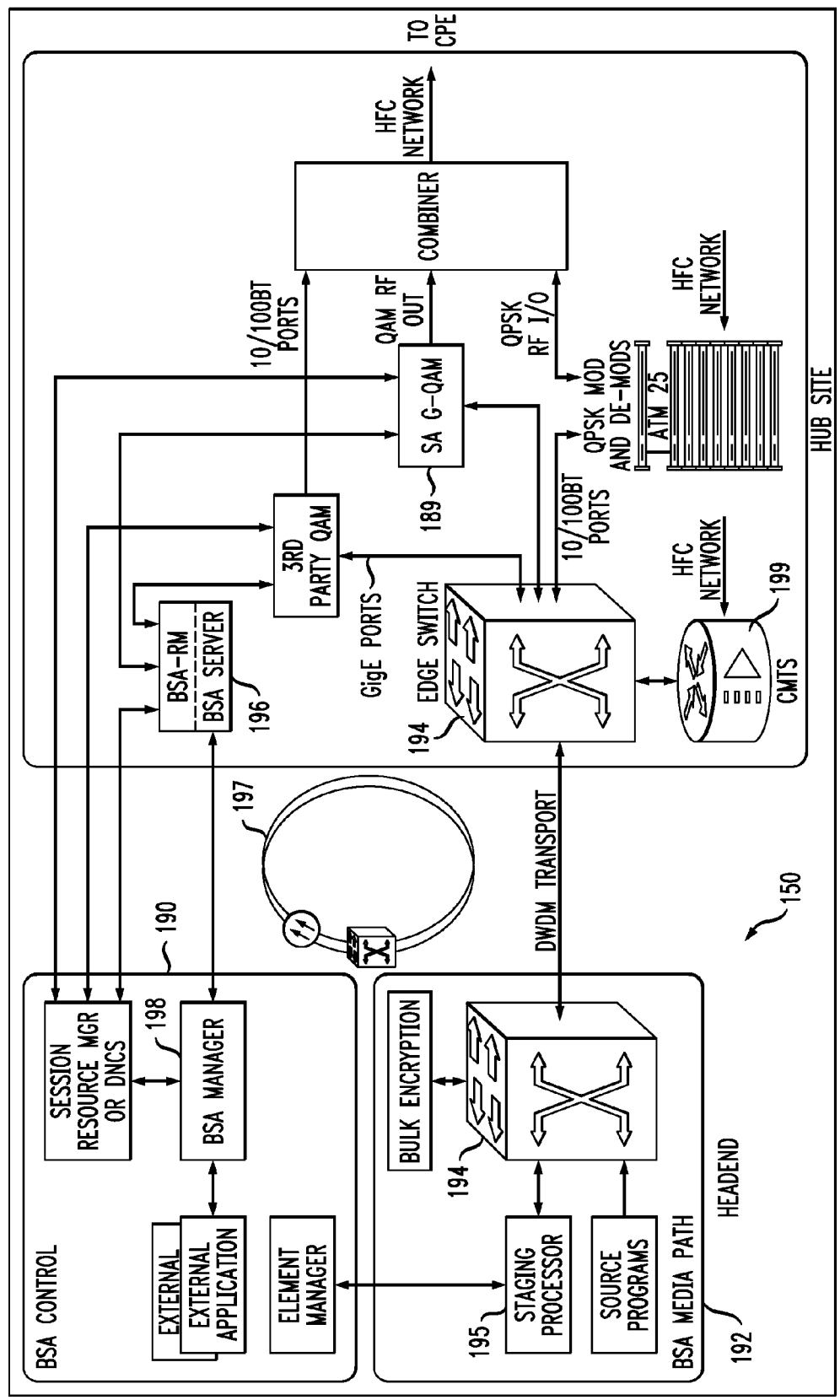
FIG. 1c is a functional block diagram illustrating one exemplary broadcast switched architecture (BSA) network useful with one or more embodiments of the present invention.

FIG. 1*c* illustrates an exemplary "switched" network architecture also useful with one or more embodiments of the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1*c* shows the implementation details of one exemplary embodiment of this broadcast switched network architecture. Specifically, the head-end 150 contains switched broadcast control and media path functions 190, 192 (the latter including staging processor 195); these elements cooperate to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the head-end). An optical transport ring 197 is utilized to distribute the dense wave-division multiplexed (DWDM) optical signals to each hub in an efficient fashion.

US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture useful with one or more embodiments of the present invention, although it will be recognized by those of ordinary skill that other approaches and architectures may be substituted.

In addition to "broadcast" content (e.g., video programming), the systems of FIGS. 1*a*-1*c* may also deliver Internet data services using the Internet Protocol (IP), although other protocols and transport mechanisms of the type well known in the digital communication art may be substituted. One exemplary delivery paradigm comprises delivering MPEG-based video content, with the video transported to user personal computers (PCs) (or IP-based set-top boxes (STBs)) over DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream quadrature amplitude modulation (QAM) channels (QAMs) to the tuner of the user's STB or other receiver device for viewing on the television, and also as packetized IP data over the DOCSIS QAMs to the user's PC or other IP-enabled device via the user's cable modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component. Note also that edge switch 194 in block 150 in FIG. 1c can, in the most general case, be the same or different as that shown in the hub site of FIG. 1c. Also, in other embodiments, CMTS 199 could be located in a place other than the hub site.

The edge switch 194 forwards the packets received from the CMTS 199 to the QAM modulator 189, which transmits the packets on one or more physical (QAM-modulated RF) channels to the CPEs. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

It will be appreciated that while the exemplary embodiments presented herein are described in the context of Internet services that include multicast and unicast data, the present invention is applicable to other types of services that include multicast transmission of data delivered over a network having multiple physical channels or even virtual or logical channels. For example, switching between various physical channels that comprise a virtual channel, can itself be conducted according to the "switched" approach. As a simple illustration, if a first virtual channel is comprised of physical channels (e.g., QAMs) A, B and D, and a second virtual channel is comprised of QAMs C, E and F, a cable modem (CM) or other CPE can be configured to switch between the A/B/D and C/E/F virtual channels as if they were a single QAM.

The configurations shown in FIGS. 1-1C are exemplary in nature and different approaches may be used in other embodiments; such other approaches may have more or less functionality (for example, high speed Internet data services might be omitted in some cases).

FIG. 2 illustrates one exemplary embodiment of a generalized software provisioning architecture. As shown in FIG. 2, the architecture 200 includes a "server" process 202, which may be disposed for example on a server or other device at the head-end 150 of the network, at a BSA switching hub (see FIG. 1c), or yet other location as desired. The server functionality may be integrated with one or more other existing components (e.g., an application server 104 as shown in FIG. 1). By disposing the server process 202 at the head-end, BSA hub, or some other node with connectivity to multiple CPE, the server process can advantageously service and provision multiple CPEs 106 simultaneously.

The "server" functionality may be provided by a number of existing components and/or processes already in place within the network, such as for example use of existing messaging facilities to generate and deliver the update messages, the use of a carousel function to select and download applications or other components, and so forth. Each of the foregoing features is described in greater detail subsequently herein.

As shown in FIG. 2, a corresponding client process 204 is disposed on each CPE 106 (or a selected subset of all CPE); this process allows the CPE 106 to receive/send information from/to the server process 202, for e.g., determining the need for provisioning, remote configuration and provisioning of the CPE 106, monitoring of operations, statistics, status information, and the like. In one exemplary embodiment, the client process 204 is a "bootstrap" program or module that is installed on the CPE 106 and adapted to operate under certain circumstances.

The client portion 204 may also be in logical communication with other processes within the CPE, such as for example an OCAP-compliant monitor application or middleware 208, a user interface (and configuration) process 206, other applications 210 running on the CPE, and the like. Client processes 212 on other devices, such as a device coupled to the CPE 106 via a wireless or networking interface, can also communicate with the client process 204 if desired.

The CPE 106 may also include various other processes, such as a media server, web or http server, and so forth. These can be used in a stand-alone fashion (e.g., where a personal media device (PMD) in the premises network merely accesses the media server in order to obtain stored personal content from the CPE 106), or as a local proxy for other distant servers (such as a remote third party web server, and the like). Moreover, the CPE may take any number of forms, including for example a set-top box (e.g., DSTB); a converged device or "hive" as disclosed in US Patent Publication 2007/0217436 of Markley et al, entitled "Methods and apparatus for centralized content and data delivery," the complete disclosure of which is expressly incorporated herein by reference in its entirety for all purposes; a wireless satellite receiver; or even a mobile wireless device in direct or indirect data communication with the operator network domain.

Figure 3:
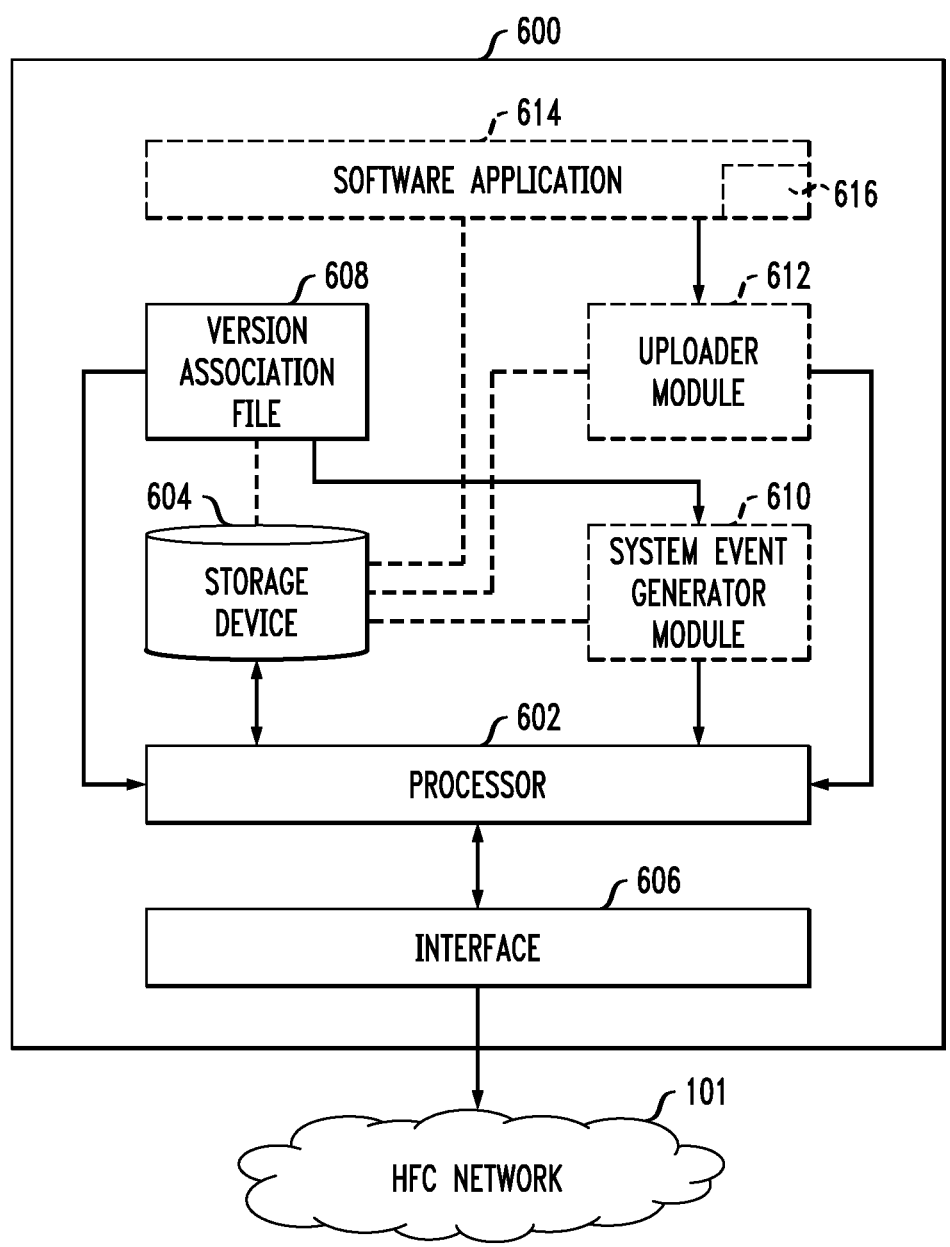
FIG. 3 is a functional block diagram of a server configured to provision CPE software.

FIG. 3 is a functional block diagram of an exemplary server 600 configured to transmit a software application 614 or other component to a CPE 106. A processor 602 resident on the server 600 is in data communication with a network interface 606 and a storage device 604. The storage device 604 comprises a non-volatile memory device such as a hard disk that is electrically coupled to the processor 602. Resident on the Storage Device 604 is a Version Association File (VAF) 608 or other comparable data structure that maps an application version 616 of a given software application 614 to a range of addresses corresponding to those CPE 106 that have been designated for that application version 616.

A system event generator module 610 is also present on the storage device 604. The system event generator module 610 may broadcast a DSM-CC catalog update message over the HFC Network 101 upon a modification to the Version Association File 608. The DSM-CC Catalog Update message may be transmitted to the CPE 106 along with the Version Association File 608 (or the two may be sent independently but in a substantially contemporaneous fashion). In other instances, only the DSM-CC catalog update message is sent to the CPE 106 upon a modification to the Version Association File 608. Of course, the invention is not limited to DSM-CC messages. For example, as an alternative (or in addition) to a DSM-CC message, an IP message can be used.

The software application 614 is present on the storage device 604 of the server, along with an uploader module 612 that is used to broadcast the application version 616 of the software application 614 over the HFC network 101. The CPE 106 downloads the application version 616 of the software application 614 if that CPE has been designated in the Version Association File 608 (for example, by address, MAC, TUNER ID, TUNER USE, opaque variable, etc.) and the application version 616 of the software application 614 is not already present on the CPE 106. US Patent Publication 2007/0022459 of Gaebel et al., entitled "Method and apparatus for boundary-based network operation," the complete disclosure of which is expressly incorporated herein by reference in its entirety for all purposes, describes exemplary approaches for implementing TUNER USE, TUNER ID, and opaque variables.

In one variant, the Version Association File 608 contains at least six fields: (i) an ORG ID, (ii) an App ID, (iii) an App Type, (iv) a Launch Order, (v) a Target Type, and (v) Targets. These fields are described in the aforementioned Anderson et al. publication 2008/0134165.

Figure 4:
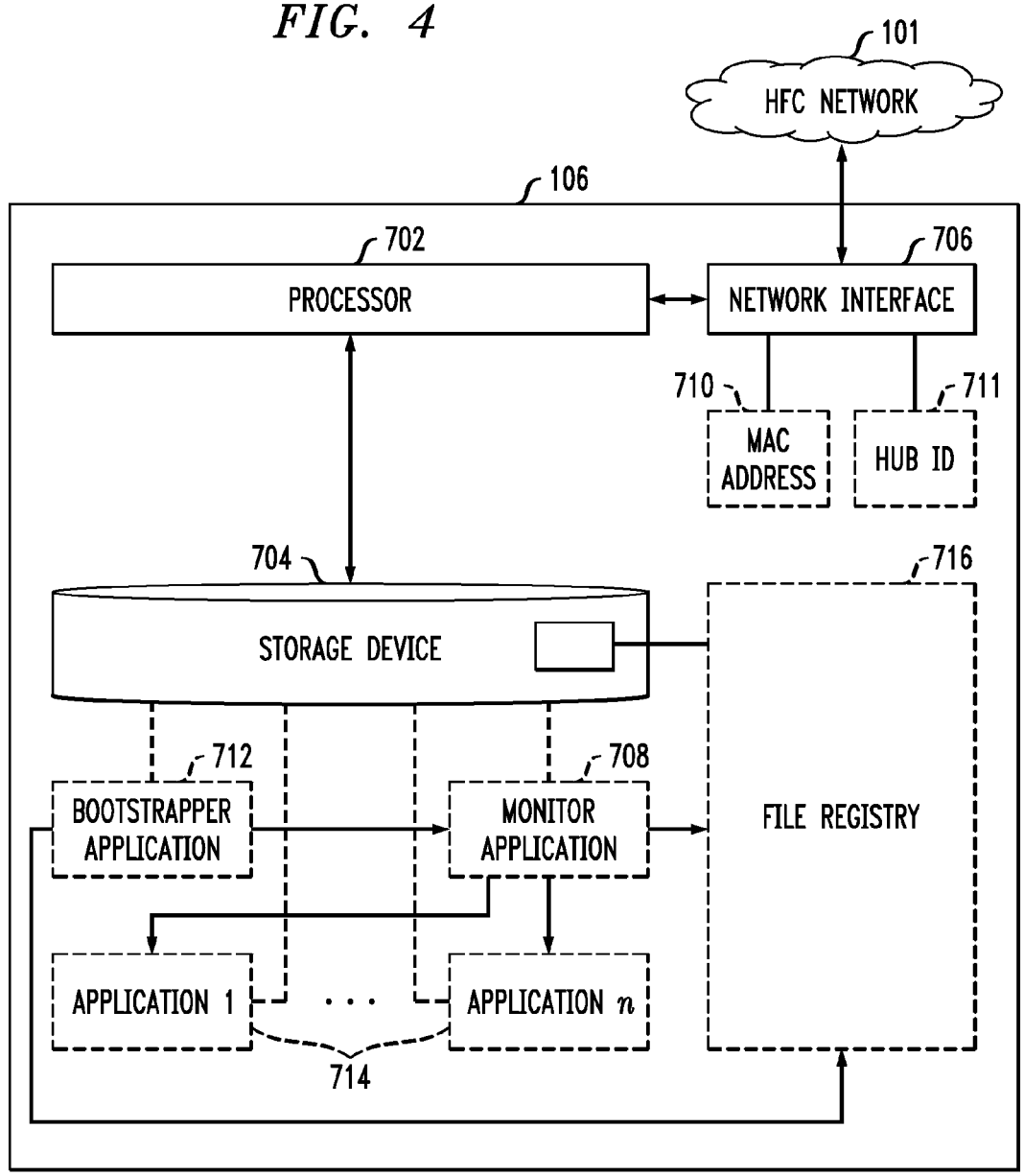
FIG. 4 is a functional block diagram depicting exemplary customer premises equipment.

FIG. 4 illustrates a functional block diagram of an exemplary CPE 106 configured to implement the download and provisioning methods. As shown in FIG. 4, a processor 702 resident on the CPE 106 is in data communication with the network interface 706 and a storage device 704. The processor 702 is used to execute instructions such as those instructions used in communicating with the network interface 706 and those instructions used for loading and storing data to the storage device 704, as is well known in the electronic arts. The network interface 706 manages data transmitted and received over, e.g., the HFC Network 101, and comprises the MAC Address 710 and the Hub ID 711. Depending on the network topology and delivery mechanism used, the interface 706 may comprise any number of different modalities including without limitation a radio frequency tuner stage (and de-multiplexer (demux)) of the type well known in the art, a Data Over Cable Service Interface Specification (DOCSIS) or other cable modem, an IP interface, 802.3 Ethernet interface, 802.11 WiFi interface, and so forth. The data, applications, or content received by the CPE 106 via the interface is stored on the storage device 704.

In one embodiment, the storage device 704 is a non-volatile memory device such as a hard disk that is in data communication with the processor 702. Resident on the storage device 704 is a bootstrap application 712, a monitor application 708, a file registry 716, and optionally, one or more of the application versions 616 of one or more software applications 614, 714 previously described. The exemplary file registry 716 is a table of numeric entries assigned to each of the application versions 616 of each of the software applications 614, 714 currently installed in the CPE or connected devices. The aforementioned Anderson et al. Publication 2008/0134165 describes a bootstrap application 712 and monitor application 708, which, given the teachings herein, may be modified by the skilled artisan to implement one or more embodiments of the invention.

Figure 5:
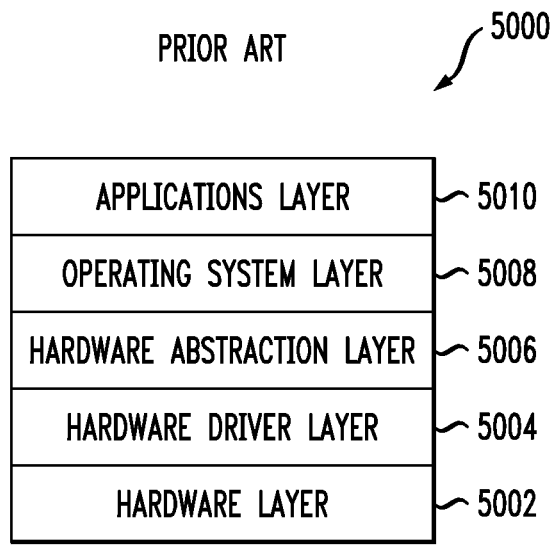
FIG. 5 is a conceptual view illustrating a conventional software architecture.

With reference to FIG. 5, at least a portion of a standard software architecture 5000 is shown. As apparent from the figure, the software architecture 5000 is depicted conceptually as a layered (e.g., stacked) relational framework or model including a hardware layer 5002, a hardware driver layer 5004 residing on top of the hardware layer, a hardware abstraction layer 5006 on top of the hardware driver layer, an operating system layer 5008 on top of the hardware abstraction layer, and an applications layer 5010 on top of the operating system layer. Conventionally, digital television (DTV) relies on a single, monolithic, software image being downloaded into a persistent storage device.

Figure 6:
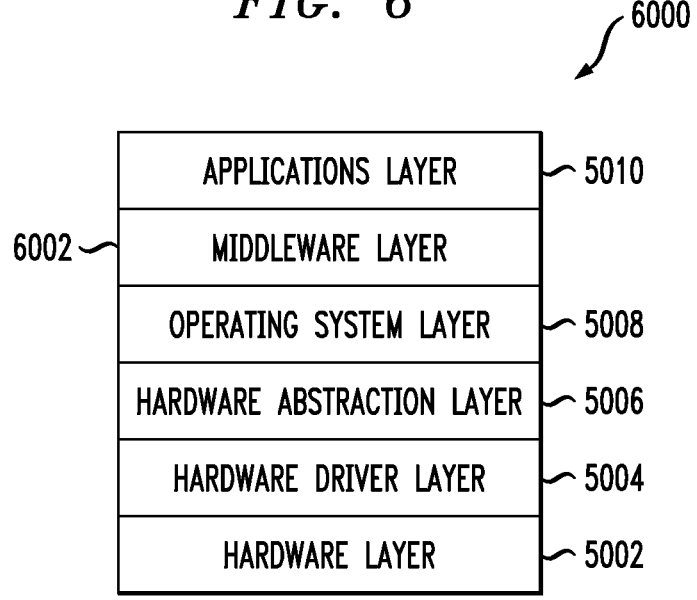
FIG. 6 is a conceptual view illustrating an exemplary software architecture useful in implementing at least a portion of one or more embodiments of the invention.

With reference now to FIG. 6, at least a portion of an exemplary software architecture 6000 is shown in which techniques of the present invention may be suitably implemented. Software architecture 6000 is distinguishable from architecture 5000 shown in FIG. 5 at least in that architecture 6000 includes a middleware layer 6002 residing between the operating system layer 5008 and the applications layer 5010.

Using the Open Cable Application Platform (OCAP), television software may be downloaded and used as separate components. This is facilitated by the insertion of the middleware layer, which allows the hardware drivers, hardware abstraction layer (HAL), operating system (OS), and middleware to reside on the device and the application to be downloadable from the distribution system via hypertext transfer protocol (HTTP), object carousel, or some other connectivity mechanism. The skilled artisan will be familiar with the OCAP specifications as promulgated by Cable Television Laboratories, Inc. Louisville, Colo., USA.

Because OCAP is an open standard based platform, multiple vendors may develop different applications to run on the device platform. One or more aspects of the invention allow a user to select which software component(s) (e.g., application program(s)) and/or which specific version of the software component(s) he or she wishes to run on the device (e.g., STB 106). In one or more illustrative embodiments, during or shortly after boot-up, an initialization application (e.g., a "bootstrapper" program 712), or alternative routine, is loaded on the STB device which is operative to provide a prescribed period of time (e.g., several seconds) during which the user is afforded an opportunity to select, from among multiple interactive video software components, one or more interactive video software components to run on the device.

The prescribed time during which the user is able to select one or more software components to run on the STB preferably refers to the time during execution of an initial monitor program. The monitor program is typically initially loaded onto the STB and determines what additional software will be loaded on the STB. In this manner, the user can preferably initiate a selection routine, or alternative interface means, immediately after boot-up, such as, for example, by depressing a remote control or other device button or key (e.g., "MENU" button) to bring up a selection menu. From the selection menu, the user can then select which interactive video software, or software components, and/or which version of that software he or she wishes to execute on the device.

Boot-up, or an alternative initialization process, typically occurs during a power-on interval of the STB device, which may be initiated in response to the user depressing a power ("ON") button on the device, or by depressing a power button on a remote control unit, either wired or wireless, associated with the device. The STB may be operative to perform initialization routines at other times as well, such as, for example, during a standby mode of operation. While the window of time during which the user may select which software component(s) to run on the device is preferably several seconds in duration, the invention is not limited to any specific time period for making such a selection. Moreover, while selection of the one or more software components may be afforded to the user immediately following boot-up, such as, for example, within a prescribed interval of time following boot-up, it is to be appreciated that an opportunity may be afforded to the user during one or more other prescribed times (e.g., during standby mode or during periods of programming inactivity) or in response to a user-initiated control signal (e.g., user-initiated program selection request), according to other embodiments of the invention. The other intervals of time during which user selection of software components is provided may be in place of or in addition to such selection opportunity afforded following boot-up.

Advantageously, in one or more embodiments, this mechanism also allows multiple applications, or components thereof, to be selected by the user. For example, if a user desires to have a television application and a web browser application loaded, he or she selects each application. Upon selection of an application, the STB device may be required to reboot in order for any changes to take effect. If a user selection of software components is made after video content delivery has started, the STB device may be preferably operative to stop the video content delivery and to resume such video content delivery at the point in time where it was halted once the device has completed rebooting. For live programming, this may require digital video recorder (DVR)-like functionality to capture and store the video content while the STB device 106 is rebooting. In another aspect, rebooting may be delayed until the user is not watching television.

Once the user has made his or her selections, the user then presses another designated key on the remote control or front panel of the STB device, or navigates to a soft key that allows the device to then load the selected applications on the STB and execute them for the user. Execution of the selected application(s) may be performed immediately once loading has completed, or, alternatively, execution may be delayed by a prescribed period of time or after a prescribed event occurs, according to aspects of the invention. If the user does not press the designated key during a boot cycle, or alternative prescribed time interval, the device will load and execute those applications that were previously selected by the user.

As an added feature, the system is preferably adapted to prevent the user from loading conflicting software applications. That is, the system would, for instance, disallow the loading of multiple electronic program guides (EPGs) or multiple caller ID (identity) applications. This is particularly advantageous when updating existing applications on the STB device. In a further aspect of the invention, an Open-Cable software distribution system provides a transport mechanism such as an HTTP server or object carousel and a metadata file describing the available applications and their compatibility with other applications and devices.

Figure 7:
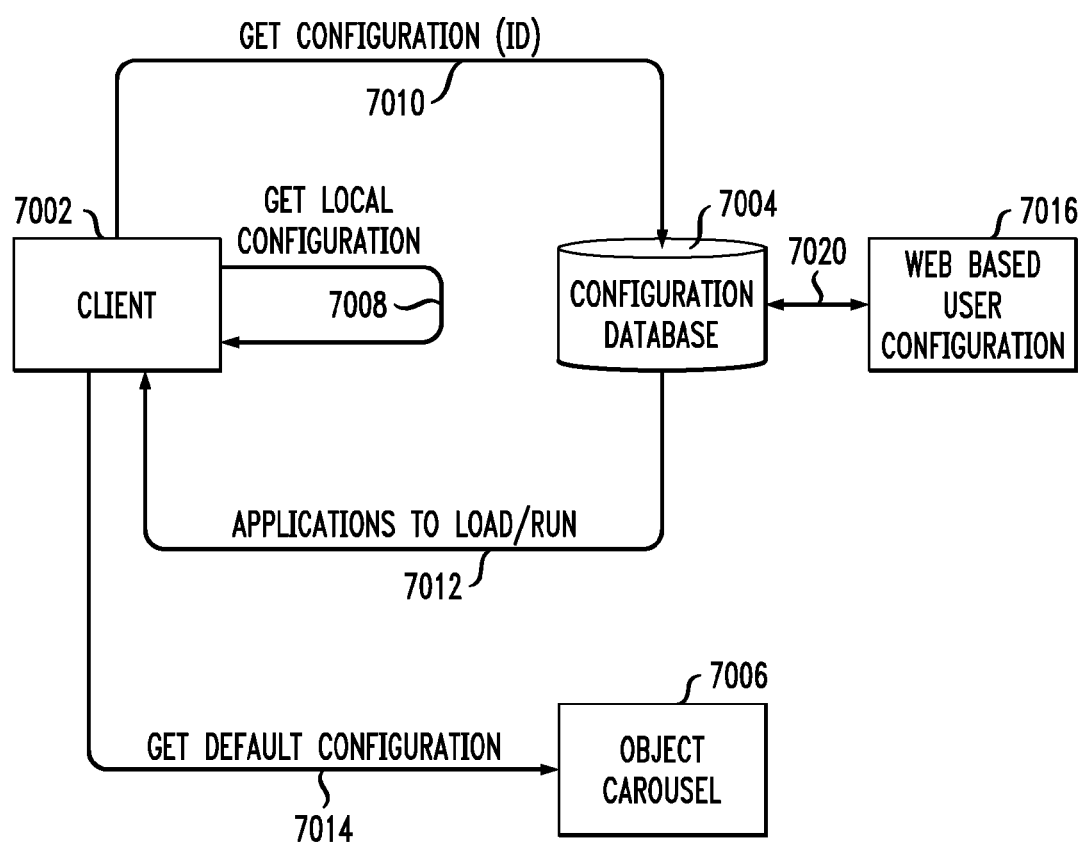
FIGS. 7 and 8 are functional block diagrams illustrating user selection of software components in a television set-top box (STB), according to aspects of the invention.
Figure 8:
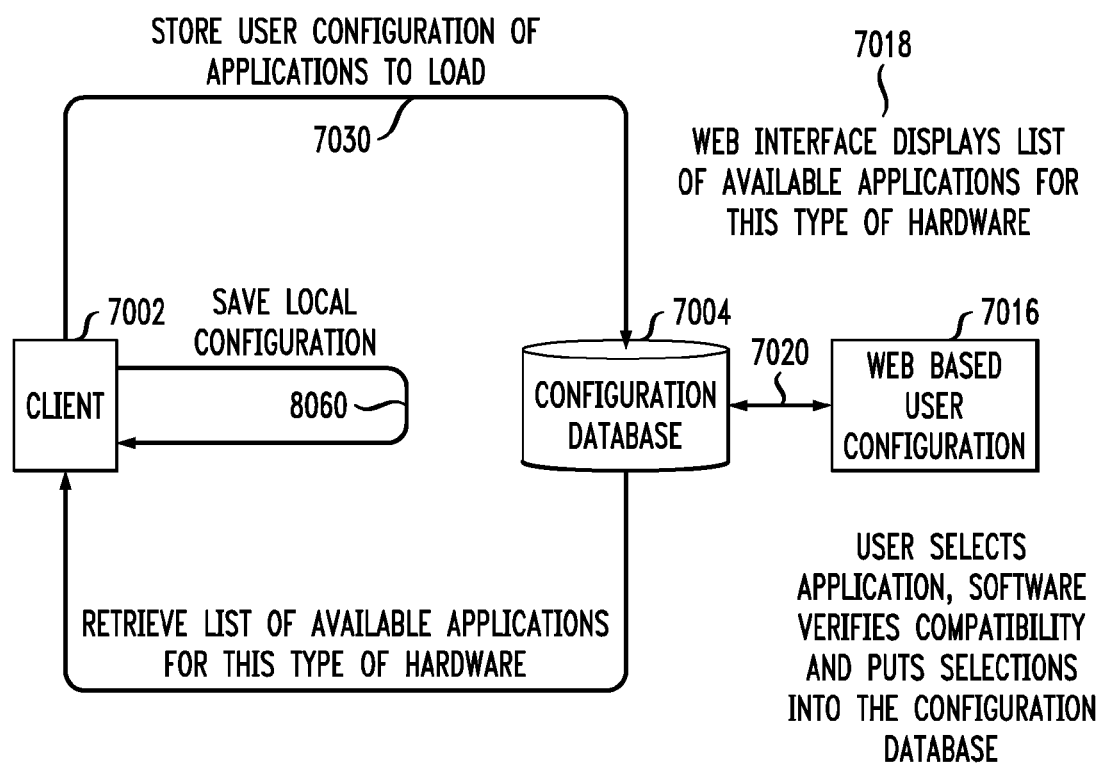

Reference is now made to FIGS. 7 and 8, which depict exemplary client-server interactions for network-based user selectable applications. A client device or process 7002, which may be implemented, for example, on a CPE 106 (e.g., a set-top terminal or STB), powers up and, at 7008, checks to see if it has a local list of applications in non-volatile memory such as storage device 704. When two-way network communication is available, the client device 7002 will query a configuration database server 7004, as shown at 7010, using a unique identifier such as, for example, a network MAC address. The database server 7004 will preferably return a list of applications, retrieved by the client device 7002, that the client should execute, as shown at 7012. When the local list of applications on client device 7002 does not match those from the database 7004, then the local copy is updated (see also step 8060 discussed below). One or more applications in the returned list of applications are then executed by the client device 7002. Client device 7002 may access database 7004 using, for example, the HFC network and functionality of server 202 with corresponding version association file (VAF) as shown in FIG. 2 and also discussed with respect to FIG. 3.

When two-way connectivity is not available, the client device 7002 will preferably test to see if it has a list of applications stored locally, as at 7008. The client device 7002 will then determine whether the applications are available via an object carousel 7006 (or an alternative storage location) as shown at 7014. If the applications are available via object carousel 7006, then the application (for example, monitor application 708 shown in FIG. 4) on client 7002 will load and execute the applications from the object carousel. When two-way connectivity is not available and it is determined at 7008 that the client device 7002 has no locally stored list of applications, then the client device will preferably read a default configuration file from the object carousel 7006, load those applications associated with the default configuration file, and execute them as desired.

With reference also now to FIG. 8, in order to configure the database 7004, the client device 7002 can produce a local configuration, as at 7030, by having the user interface with the client device and select from among the available applications. Alternatively, or in addition to, according to embodiments of the invention, the user can configure the system via interaction with a web-based interface 7016 which provides a list of available applications corresponding to a given type of hardware, as shown at 7018, and stores the configuration in the configuration database 7004, as shown at 7020. The local configuration may be saved in client 7002 as at 8060.

Thus, a cable MSO may use OCAP to develop software. Heretofore, all STBs have typically had a monolithic image; once the image was determined, it was distributed to all STBs and it was homogeneous in nature across all STBs. OCAP provides a middleware layer that beneficially allows the MSO to individually modify the applications loaded on each STB. In one or more embodiments, the end user selects which applications he or she wants to run on his or her STB. As described with respect to FIG. 8, in one illustrative approach, a selection menu is provided on the user's television set (connected to or part of a CPE such as an STB), while in another approach, the user accesses a web page, or alternative web interface, and selects which applications he or she would like to load and execute on his or her STB.

As alluded to above, one or more embodiments make use of the VAF. In current techniques, the VAF only allows a minimal number of STBs to be entered into it, inasmuch as, if the list were longer, every STB on the system would have to parse the long list, which is not practical. The VAF has instructions as to which applications are to be loaded on the CPE. In some current techniques, the VAF is a file on the object carousel, while in one or more instances, the database is located on the server system.

In practice, every STB has a MAC address or alternate unique identifier associated with its network interface card (NIC). As previously stated, the STB includes a bootstrapper program (that is, the first piece of code that is ever run on the device), and that piece of code causes the MAC address to be sent to the database server 7004 and inquires which applications are to be loaded on the STB. The bootstrapper code may be provided, for example, by the MSO. The database server 7004, at 7012, returns the list of applications that the particular STB should load from the object carousel 7006 or via HTTP from a distribution server (for example, server 104), or from an alternative storage location. As noted, given the teachings herein, the bootstrapper application of the Anderson et al. publication 2008/0134165 could be modified by the skilled artisan to implement one or more aspects of the invention.

With continued reference to FIGS. 7 and 8, once the client device 7002 (e.g., STB 106) retrieves that list of applications at 7012, it can go through and load the applications that the user has selected. The list of applications is transferred to the database 7004, for example, by having the user (for example, the subscriber) execute a prescribed application on his or her television (for example, a menu structure) and input (for example, by scrolling down and selecting menu items) which application(s) to load on the client device. Then, the data regarding which application(s) to load is stored in the configuration database 7004 (preferably comprising non-volatile memory) so that the next time the subscriber's client device 7002 re-boots, it is able to determine locally which applications to load. In an alternative approach, the user (e.g., subscriber) can go through the web interface 7016 that connects to the same server back end database 7004 and he or she can select which application(s) he or she wants to load from that point. Similarly, when the client device 7002 re-boots, it will load the selected application(s) stored, for example, in the object carousel 7006 or an alternative storage location.

In the case when two-way communications are temporarily lost, if the client device 7002 cannot communicate with the back end database server 7004 when the client device reboots, it is essentially not possible, or at least impractically difficult, to obtain the list of applications to be run on the device. In this instance, the client device 7002 may be operative to first determine whether or not there is a local copy of the applications that were selected to run, which can be accomplished by checking the selected applications against those applications available via the object carousel (HTTP would not be available since it utilizes TCP/IP which requires two-way communications) and, when such applications are present on the object carousel, to run those applications. The client device may utilize a mechanism in which OCAP stores applications locally and/or to a disk, or alternative local storage device.

The client device 7002 may be operative in a default mode, such that when two-way communications are lost, the client device preferably reverts back to reading the original (default) version association file on the object carousel 7006 and then it loads the appropriate applications listed therein so that the user is provided with at least some functionality (such as, for example, the ability to watch television) until network connectivity is re-established.

For a client device 7002 that has considerable local storage available (internally and/or externally), such as exists, for example, with a disk drive or other high-volume storage device, the client device may be adapted to store all, or at least a subset, of the applications to that device and to execute the stored applications upon loss of two-way communications, according to embodiments of the invention. This may be a preferred execution methodology for this type of device rather than loading a default application set.

It is to be appreciated that, although two-way communications may be lost, it may still be possible for the client device to access the object carousel for loading available applications on the STB, according to embodiments of the invention. More particularly, the carousel information is preferably contained within parameters described by the XAIT. There are at least two mechanisms in which such carousel information may be stored in the XAIT, namely, the use of a prescribed field (e.g., "transport" field) for an application in the XAIT, and the use of command line parameters passed to the initial application via user-settable parameter fields in the XAIT.

Note that even when two-way communications are lost, it may still be possible to obtain the XAIT, which is typically accessed out-of-band using one-way communications.

In some instances, the interactive video software components to be distributed to the STBs may be classified into at least two different types. A first type is software that is provided by the host manufacturer and is unique to each manufacturer. It may contain hardware driver components, the operating system, and a Java Virtual Machine, or an alternative software development platform. Each middleware component is stacked upon the other and is often referred to as a software stack. A second type of software is that which provides the actual application and user interface. This software is preferably written in a platform-independent language, such as Java, as specified, for example, by the OCAP specification set forth in the document entitled "OpenCable Application Platform Specifications, OCAP1.1 Profile," Document Control No. OC-SP-OCAP1.1.1-090612, published Jun. 12, 2009 by Cable Television laboratories, Inc., and corresponding revisions thereto, the complete contents of which are expressly incorporated by reference herein for all purposes.

Both types of software have upgrade mechanisms defined within the OpenCable standards. The software stack is preferably upgraded using the Common Download specification, as set forth in the document entitled "OpenCable™ Specifications, Common Download 2.0," Document Control No. OC-SP-CDL2.0-108-090206, Revision 108, Feb. 6, 2009, and corresponding revisions thereto, the complete contents of which are expressly incorporated by reference herein for all purposes. The Java application is distributable, for example, by at least two different illustrative mechanisms.

Figure 9:
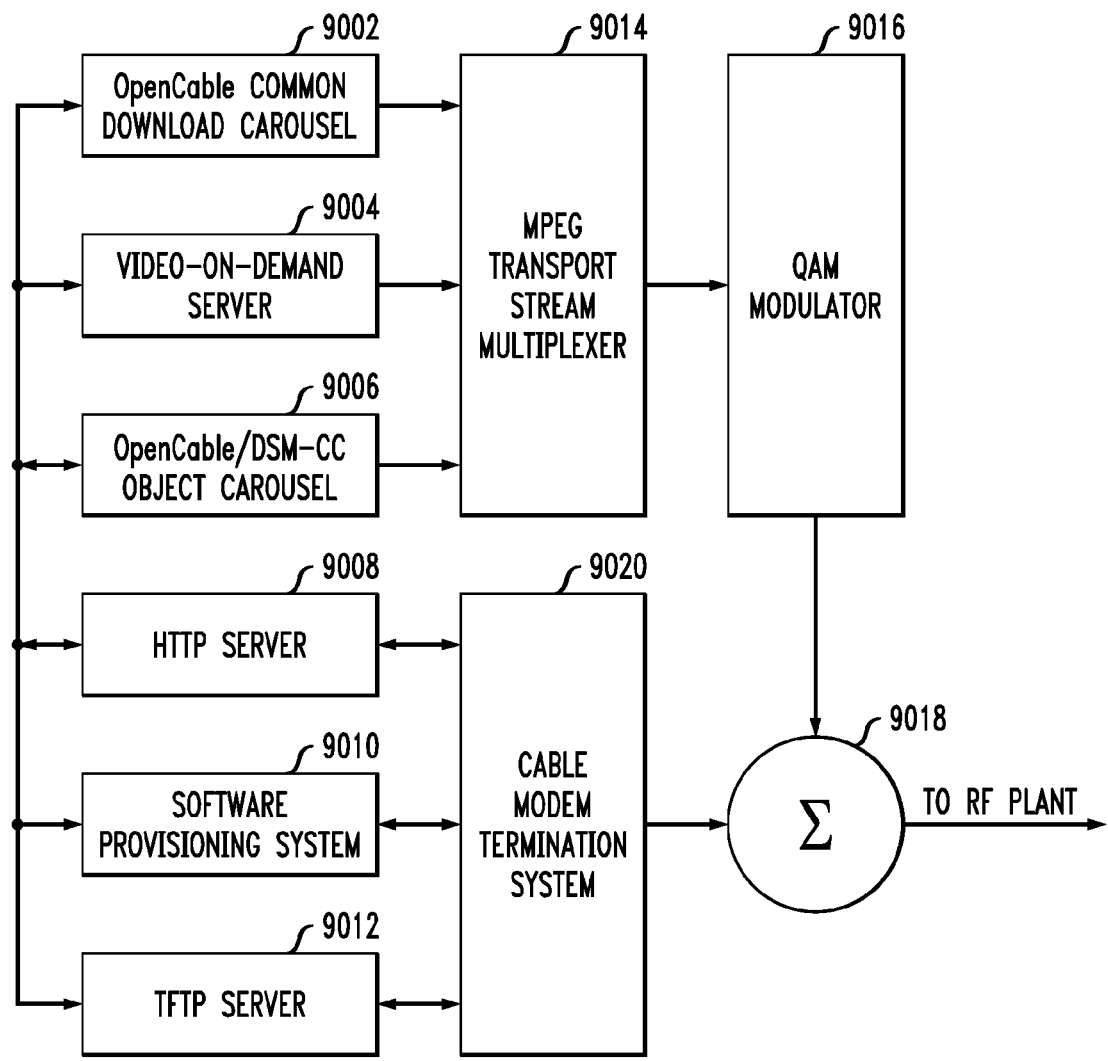

With reference now to FIG. 9, a first mechanism for distributing the Java application uses an OCAP-compliant object carousel 9006. The object carousel 9006 is preferably operative as a clocked, retransmitting first-in, first-out (FIFO) apparatus or data structure, or an alternative queue processing apparatus or structure, in that it transmits the contents of a file at a specific data rate and upon completion starts again at the beginning of the file. A second mechanism for distributing the Java application is by using the Internet Protocol (IP) and HTTP (e.g., HTTP server 9008).

A similar mechanism can be used for updating the host stack code. In this case, the host code also has at least two upgrade mechanisms. A first mechanism is via a Trivial File Transfer Protocol (TFTP) server 9012, and a second mechanism is via an OpenCable common download carousel 9002.

In some instances, a controller 9010, such as the Mystro Application Server (MAS), can be provided for purposes of software provisioning system control. Note that the Mystro Application Server, commercially available from Time Warner Cable, Inc., New York, N.Y., USA, is but one non-limiting example of a software provisioning system 9010, suitable for carrying out desired control. Video on demand server 9004 may be similar to servers 105. The elements in FIG. 9 may be located in head-end 150. For example, servers 9008, 9012 may be forms of application distribution servers 104. Elements 9014 and 9016 may correspond to MEM 162. CMTS 9020 may correspond to CMTS 156. Summer 9018 combines the material from the CMTS 9020 and QAM modulator 9016 so that it can be placed on the network 101.

Non-limiting examples of out-of-band data transmission specifications suitable for use with embodiments of the present invention include Data Over Cable Service Interface Specification (DOCSIS), which can be employed with a cable modem, and Digital Audio Video Council (DAVIC)

specification. DOCSIS defines the communications and operation support interface requirements for a data over cable system which permits the addition of high-speed data transfer to an existing Cable TV (CATV) system. It is typically employed to provide Internet access over an existing HFC network infrastructure. A system utilizing the DAVIC specification generally has significantly less bandwidth compared to DOCSIS. For example, the DAVIC system may be allocated having a bandwidth of about 50 kbps while the DOCSIS system, with a cable modem, will typically have a bandwidth in a range of about 7 Mbps to about 38 Mbps or higher. Thus, when performing an out-of-band software update, such update can be done via HTTP, but it is point-to-point; i.e., each individual STB communicates with the HTTP server 9008 and initiates a separate request for a new code load. Using such an approach, the HTTP server 9008 should be robust if a number of different requests are likely to be received at the same time.

Given the description thus far, it will be appreciated that, in general terms, a system, according to an aspect of the invention, includes a set-top box 106 having a at least one set-top box processor 702 and a set-top box memory (e.g., volatile and/or non-volatile memory coupled to processor 702). The system also includes a video content network, as discussed above, and at least one configuration server 7004 having a configuration server memory and at least one configuration server processor coupled to the configuration server memory. The at least one set-top box processor and the at least one configuration server processor are cooperatively operative to facilitate affording a user a selection of interactive video software components to run on the set-top box, and to facilitate loading selected interactive video software components onto the set-top box, the selected interactive video software components being delivered to the set-top box over the video content network. In some instances, the set-top box memory loads an initial monitor application 708, and the at least one set-top box processor and the at least one configuration server processor are cooperatively operative to facilitate affording the user the selection during execution of the initial monitor application. In one approach, the user initiates a selection routine on the set-top box, and the selection routine provides an interface for the user to select, from among a plurality of software components, at least one interactive video software component to run on the set-top box, as discussed with respect to FIG. 8. In another approach, the user is presented with a selection interface 7016 to the configuration server for selecting, from among a plurality of software components, at least one interactive video software component to run on the set-top box.

Figure 10:
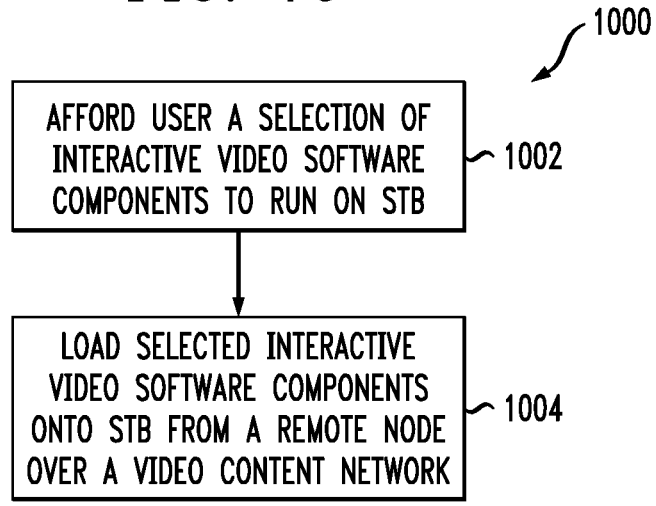
FIG. 10 is a flow diagram illustrating an exemplary method, according to an aspect of the invention.

In another aspect, and with reference to flow chart 1000 of FIG. 10, given the description thus far, it will be appreciated that, in general terms, a method for allowing user selection of interactive video software components in a television set-top box operatively coupled to a video content network, according to an aspect of the invention, includes the step 1002 of affording the user a selection of interactive video software components to run on the set-top box. An additional step 1004 includes loading selected interactive video software components onto the set-top box (in-band and/or out-of-band). The selected interactive video software components are delivered from a remote node (e.g., head end, switching hub or other intermediate node, and so on) over the video content network.

In some instances, the step of affording the user a selection of interactive video software components is performed at a prescribed time after the set-top box has completed a re-booting operation. In another approach, the step of affording the user a selection of interactive video software components is performed during execution of an initial monitor program on the set-top box.

The selected interactive video software components may be delivered to the set-top box under control of a multiple system operator (MSO). In some instances, delivery of the selected interactive video software components is performed using the Motion Pictures Expert Group (MPEG) standard from a data carousel 9006 or 9002. In addition to, or in lieu of, such an approach, Internet Protocol (IP) (e.g., from server 9008) over a Data Over Cable Service Interface Specification (DOCSIS) network can be employed (or TFTP server 9012 could be employed).

As noted above, in one approach, the user initiates a selection routine on the set-top box, and the selection routine provides an interface for the user to select, from among a plurality of software components, at least one interactive video software component to run on the set-top box, as discussed with respect to FIG. 8. Again, as noted above, in another approach, the user is presented with a selection interface 7016 to the configuration server for selecting, from among a plurality of software components, at least one interactive video software component to run on the set-top box. In this later case, the selection interface may be, for example, in the form of a selection menu, with each of the plurality of software components available for selection being displayed as items in the selection menu.

In one or more embodiments, an additional step includes obtaining a local list of interactive video software components to load on the set-top box (the list may have been stored, for example, as described with respect to reference numeral 8060 above). The local list of interactive video software components can be stored in non-volatile memory associated with the set-top box (e.g., file registry 716 in memory device 704). At least a portion of the non-volatile memory associated with the set-top box in which the local list of interactive video software components is stored may be accessible to the operating system and/or a middleware layer of the set-top box.

As described with respect to FIGS. 7 and 8, in a case when two-way communication between the set-top box and a configuration database 7004 is unavailable, additional steps may include reading a local list of interactive video software components to load on the set-top box, as per reference character 7008; determining which interactive video software components to load on the set-top box based at least in part on the local list of interactive video software components; and loading those of the interactive video software components (for example, applications 714) that it is determined to load in the determining step, from an area of non-volatile memory on the set-top box to which an operating system of the set-top box and a middleware component of the set-top box have access.

In some instances, method steps includes establishing two-way communication between the set-top box 7002 and a configuration database 7004 using a unique identifier (for example, MAC address); and retrieving, from the configuration database, a list of interactive video software components that are available to load on the set-top box for a device type corresponding to the unique identifier. The list of interactive video software components may be stored in an extended application information table (XAIT). Additional steps may include having a monitor application 708 of the set-top box pass the extended application information table to middleware of the set-top box; having the middleware of the set-top box add the interactive video software components in the list to an applications database; and having the monitor application request execution of the interactive video software components in the list.

Recalling reference characters 7004, 7016, and 7020, in some instances, method steps include establishing two-way communication between a configuration database 7004 and a network-based user interface 7016; obtaining, using the network-based user interface 7016, a list of software components available to load on the set-top box for a device type of the set-top box; and selecting, using the network-based user interface 7016, at least one interactive video software component to load on the set-top box. In one or more instances, an additional step includes verifying compatibility of a user-selected interactive video software component as a function of the device type of the set-top box.

Recalling reference characters 7008, 7010, and 7012, in some instances, method steps include obtaining a local list of interactive video software components to load on the set-top box, as at 7008; establishing a connection between the set-top box and a configuration database, as at 7010; and, when at least a given one of the interactive video software components to load on the set-top box does not match a corresponding interactive video software component stored in the configuration database, updating the given one of the interactive video software components, as at 7012.

System and Article of Manufacture Details

The invention can employ hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a tangible computer-readable recordable storage medium (or multiple such media). Appropriate interconnections via bus, network, and the like can also be included.

Figure 11:
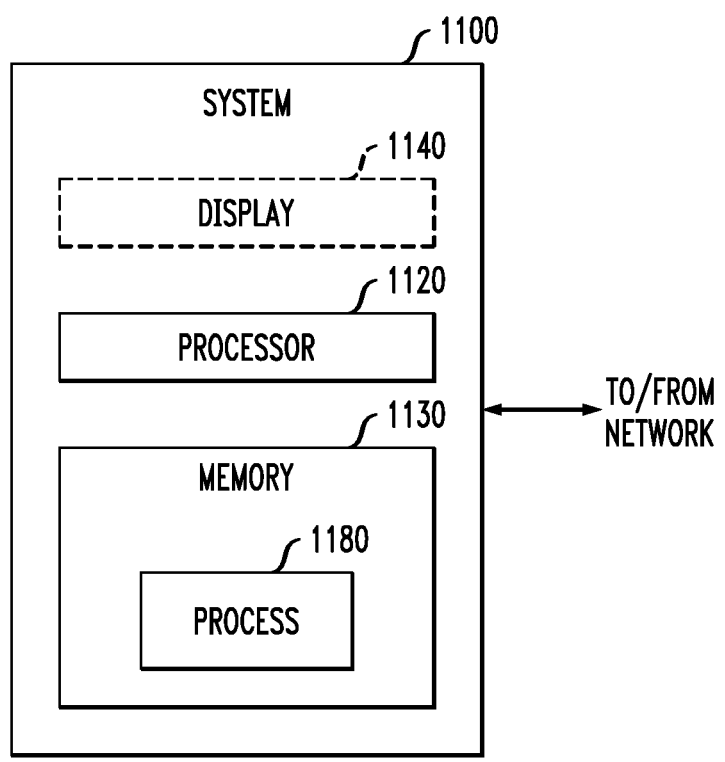
FIG. 11 is a block diagram of an exemplary computer system useful in implementing at least a portion of one or more embodiments of the invention.

FIG. 11 is a block diagram of a system 1100 that can implement part or all of one or more aspects or processes of the present invention, processor 1120 of which is representative of processors associated with servers, clients, and other elements with processing capability depicted in the other figures (e.g., application distribution servers 104, VOD server 105, CPE 106 with processor 702, a processor of the server in FIG. 2 which executes the process 202, server 600 with processor 602, processor of client device 7002, configuration database server 7004, object carousel 7006 (the object carousel is typically a server with a processor), common download carousel 9002, VOD server 9004, object carousel 9006, HTTP server 9008, software provisioning system 9010, TFTP server 9012, and so on). In one or more embodiments, inventive steps are carried out by one or more of the processors in conjunction with one or more interconnecting network(s).

As shown in FIG. 11, memory 1130 configures the processor 1120 to implement one or more aspects of the methods, steps, and functions disclosed herein (collectively, shown as process 1180 in FIG. 11). The memory 1130 could be distributed or local and the processor 1120 could be distributed or singular. The memory 1130 could be implemented as an electrical, magnetic or optical memory, or any combination of these or other types of storage devices. It should be noted that if distributed processors are employed, each distributed processor that makes up processor 1120 generally contains its own addressable memory space. It should also be noted that some or all of computer system 1100 can be incorporated into an application-specific or general-use integrated circuit. For example, one or more method steps could be implemented in hardware in an ASIC rather than using firmware. Display 1140 is representative of a variety of possible input/output devices.

As is known in the art, part or all of one or more aspects of the methods and apparatus discussed herein may be distributed as an article of manufacture that itself includes a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. As used herein, a tangible computer-readable recordable storage medium is intended to encompass a recordable medium, examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried out, e.g., by processing capability on individual elements in the other figures, or by any combination thereof. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention can make use of computer technology with appropriate instructions to implement method steps described herein.

As used herein, including the claims, a "server" includes a physical data processing system (for example, system 1100 as shown in FIG. 11) running a server program. It will be understood that such a physical server may or may not include a display, keyboard, or other input/output components.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. modules/submodules for server process 202, client process 204, applications and modules in FIGS. 3 and 4, modules to implement functionality of the blocks in FIGS. 7-9, and so on). The method steps can then be carried out using the distinct software modules of the system, as described above, executing on the one or more hardware processors (e.g., a processor or processors in the client and a processor or processors in the server). Further, a computer program product can include a tangible computer-readable recordable storage medium with code adapted to be executed to carry out one or more method steps described herein, including the provision of the system with the distinct software modules.

Non-limiting examples of languages that may be used include markup languages (e.g., hypertext markup language (HTML), extensible markup language (XML), standard generalized markup language (SGML), and the like), C/C++, assembly language, Pascal, Java, Enhanced TV Binary Interchange Format (EBIF), and the like.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for allowing user selection of interactive video software components in a television set-top box operatively coupled to a video content network, the method comprising the steps of:
    affording the user a selection of interactive video software components to run on the set-top box by allowing the user to initiate a selection routine on the set-top box, the selection routine providing an interface for the user to select, from among a plurality of interactive video software components, one or more interactive video software components to run on the set-top box;
    loading the one or more selected interactive video software components onto the set-top box, the one or more selected interactive video software components being delivered from a remote node over the video content network;
    obtaining a local list of interactive video software components to load on the set-top box;
    establishing a connection between the set-top box and a configuration database; and
    when at least a given one of the interactive video software components to load on the set-top box does not match a corresponding interactive video software component stored in the configuration database, updating the given one of the interactive video software components.

2. The method of claim 1, wherein the step of affording the user a selection of interactive video software components is performed at a prescribed time after the set-top box has completed a re-booting operation.

3. The method of claim 1, wherein the step of affording the user a selection of interactive video software components is performed during execution of an initial monitor program on the set-top box.

4. The method of claim 1, wherein the one or more selected interactive video software components are delivered to the set-top box under control of a multiple system operator (MSO).

5. The method of claim 1, wherein delivery of the one or more selected interactive video software components is performed using at least one of a Motion Pictures Expert Group (MPEG) standard from a data carousel and Internet Protocol (IP) over a Data Over Cable Service Interface Specification (DOCSIS) network.

6. The method of claim 1, wherein the interface comprises a selection menu, each of the plurality of interactive video software components available for selection being displayed as items in the selection menu.

7. The method of claim 1, wherein the local list of interactive video software components is stored in non-volatile memory associated with the set-top box.

8. The method of claim 7, wherein at least a portion of the non-volatile memory associated with the set-top box in which the local list of interactive video software components is stored is accessible to at least one of an operating system and a middleware layer of the set-top box.

9. The method of claim 1, further comprising, when two-way communication between the set-top box and the configuration database is unavailable, the steps of:
    reading the local list of interactive video software components to load on the set-top box;
    determining which interactive video software components to load on the set-top box based at least in part on the local list of interactive video software components; and
    loading those of the interactive video software components that it is determined to load in the determining step, from an area of non-volatile memory on the set-top box to which an operating system of the set-top box and a middleware component of the set-top box have access.

10. The method of claim 1, further comprising the steps of:
    establishing two-way communication between the set-top box and the configuration database using a unique identifier; and
    retrieving, from the configuration database, a list of interactive video software components that are available to load on the set-top box for a device type corresponding to the unique identifier.

11. The method of claim 10, wherein the list of interactive video software components is stored in an extended application information table (XAIT), further comprising:

having a monitor application of the set-top box pass the extended application information table to middleware of the set-top box;

having the middleware of the set-top box add the interactive video software components in the list to an applications database; and having the monitor application request execution of the interactive video software components in the list.

12. The method of claim 1, further comprising the steps of:

establishing two-way communication between the configuration database and a network-based user interface;

obtaining, using the network-based user interface, a list of software components available to load on the set-top box for a device type of the set-top box; and selecting, using the network-based user interface, at least one interactive video software component to load on the set-top box.

13. The method of claim 12, further comprising verifying compatibility of a user-selected interactive video software component as a function of the device type of the set-top box.

14. The method of claim 1, wherein the step of loading selected interactive video software components onto the set-top box is performed using an in-band data stream.

15. The method of claim 1, wherein the step of loading selected interactive video software components onto the set-top box is performed using an out-of-band data stream.

16. The method of claim 1, wherein a head-end of the video content network comprises the remote node.

17. A system comprising:

a set-top box having a set-top box memory and at least one set-top box processor coupled to the set-top-box memory;

a video content network; and at least one configuration server having a configuration server memory and at least one configuration server processor coupled to the configuration server memory;

wherein the at least one set-top box processor and the at least one configuration server processor are cooperatively operative to:

facilitate affording a user a selection of interactive video software components to run on the set-top box by allowing the user to initiate a selection routine on the set-top box, the selection routine providing an interface for the user to select, from among a plurality of interactive video software components, one or more interactive video software components to run on the set-top box; and facilitate loading the one or more selected interactive video software components onto the set-top box, the one or more selected interactive video software components being delivered to the set-top box over the video content network;

facilitate obtaining a local list of interactive video software components to load on the set-top box;

facilitate establishing a connection between the set-top box and a configuration database; and facilitate, when at least a given one of the interactive video software components to load on the set-top box does not match a corresponding interactive video software component stored in the configuration database, updating the given one of the interactive video software components.

18. The system of claim 17, wherein the set-top box memory loads an initial monitor application, and wherein the at least one set-top box processor and the at least one configuration server processor are cooperatively operative to facilitate affording the user the selection during execution of the initial monitor application.

19. An apparatus for allowing user selection of interactive video software components in a television set-top box operatively coupled to a video content network, the method comprising the steps of:

means for affording the user a selection of interactive video software components to run on the set-top box by allowing the user to initiate a selection routine on the set-top box, the selection routine providing an interface for the user to select, from among a plurality of interactive video software components, one or more interactive video software components to run on the set-top box; and means for loading the one or more selected interactive video software components onto the set-top box, the one or more selected interactive video software components being delivered from a remote node over the video content network;

means for obtaining a local list of interactive video software components to load on the set-top box;

means for establishing a connection between the set-top box and a configuration database; and means for, when at least a given one of the interactive video software components to load on the set-top box does not match a corresponding interactive video software component stored in the configuration database, updating the given one of the interactive video software components.

* * * * *